March 12, 1929.  A. L. N. FLEMING  1,705,246
LINKING MACHINE
Filed April 29, 1927   4 Sheets-Sheet 2
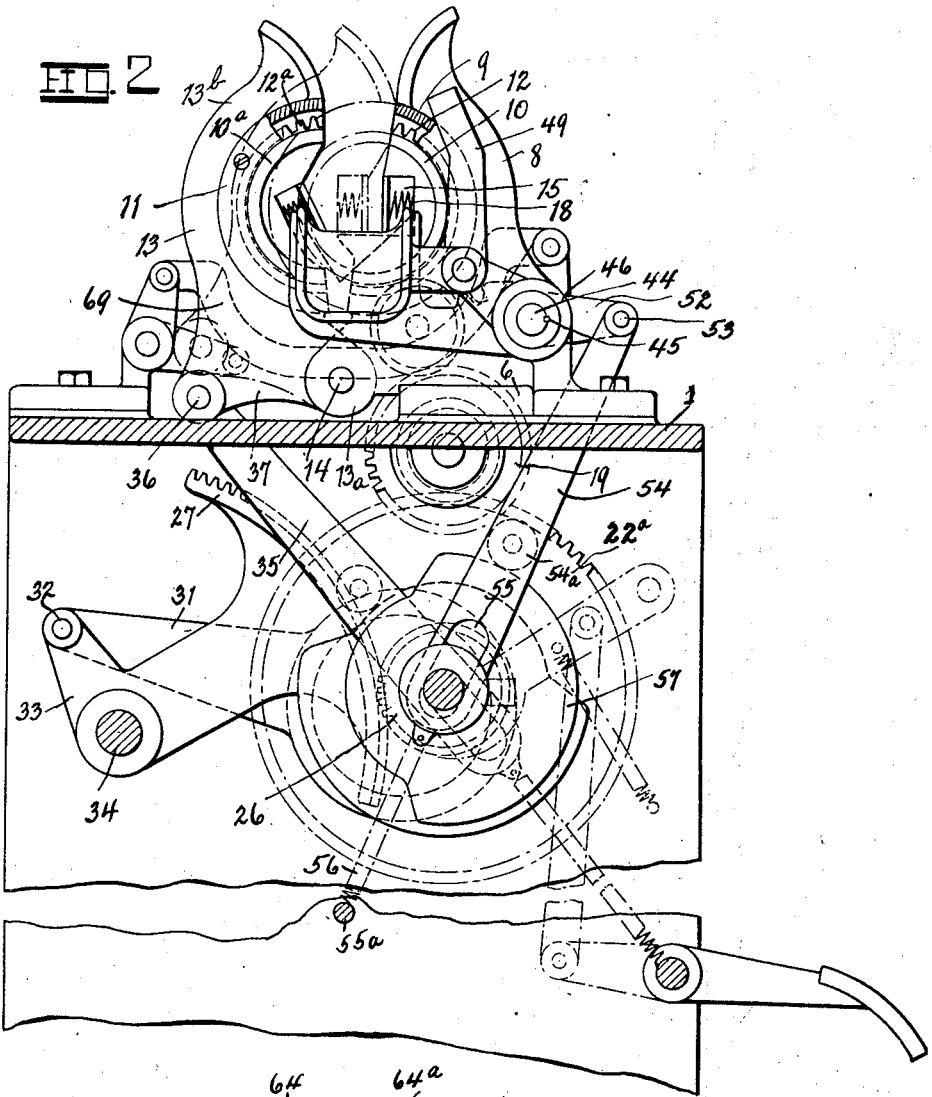
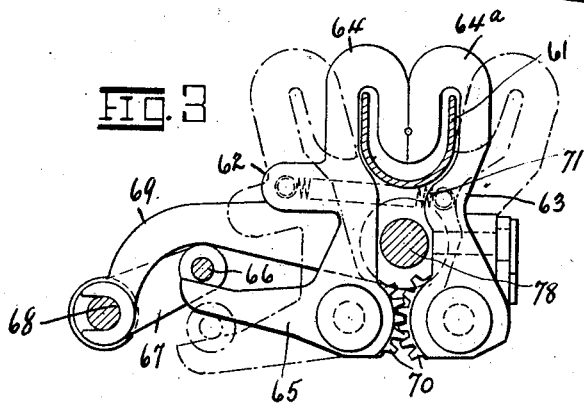
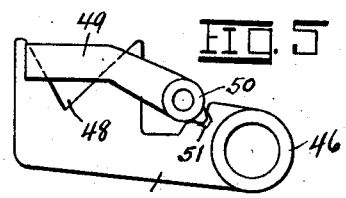
Inventor
August L. N. Fleming
by Aaron L. Applebaum
Attorney

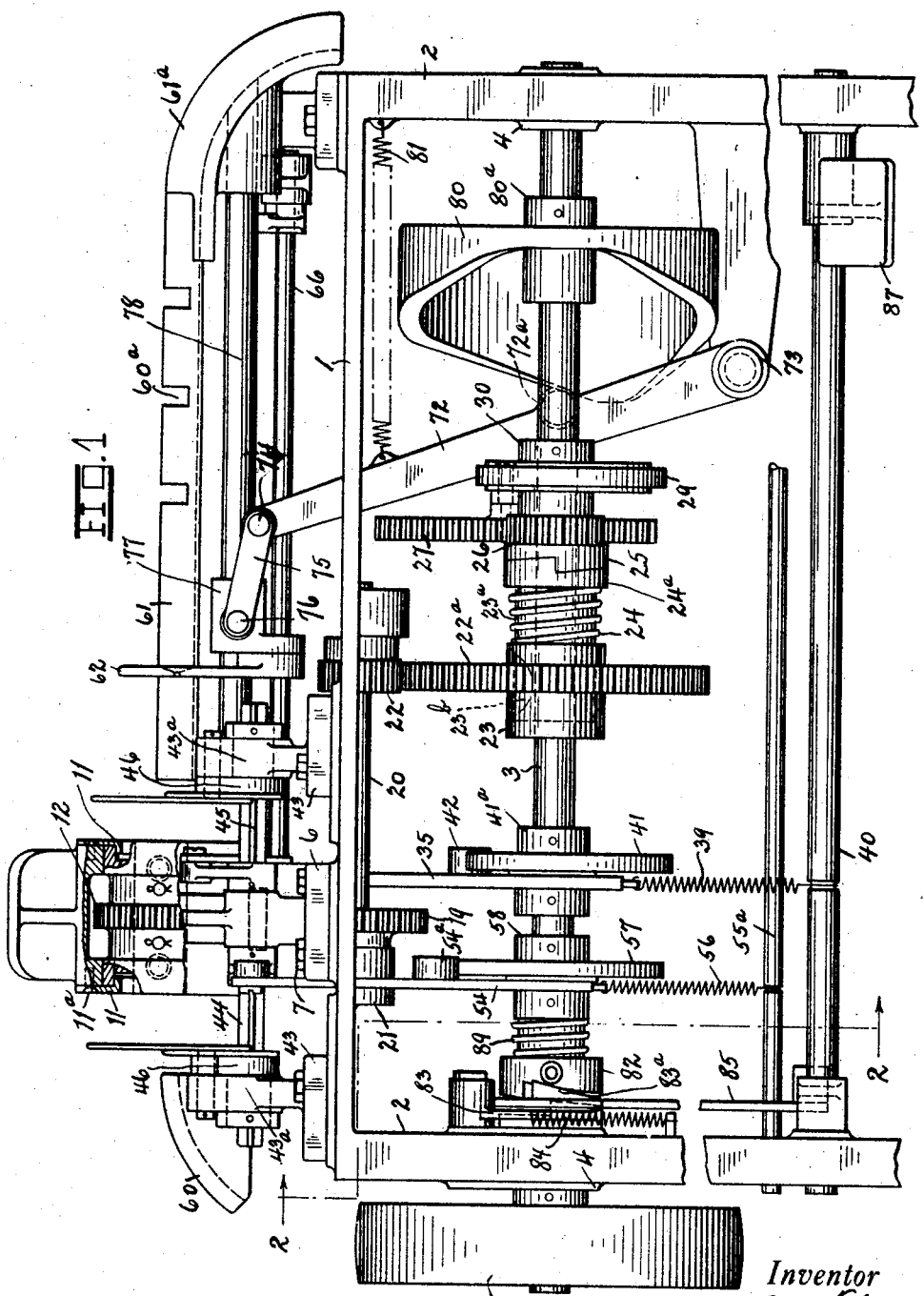

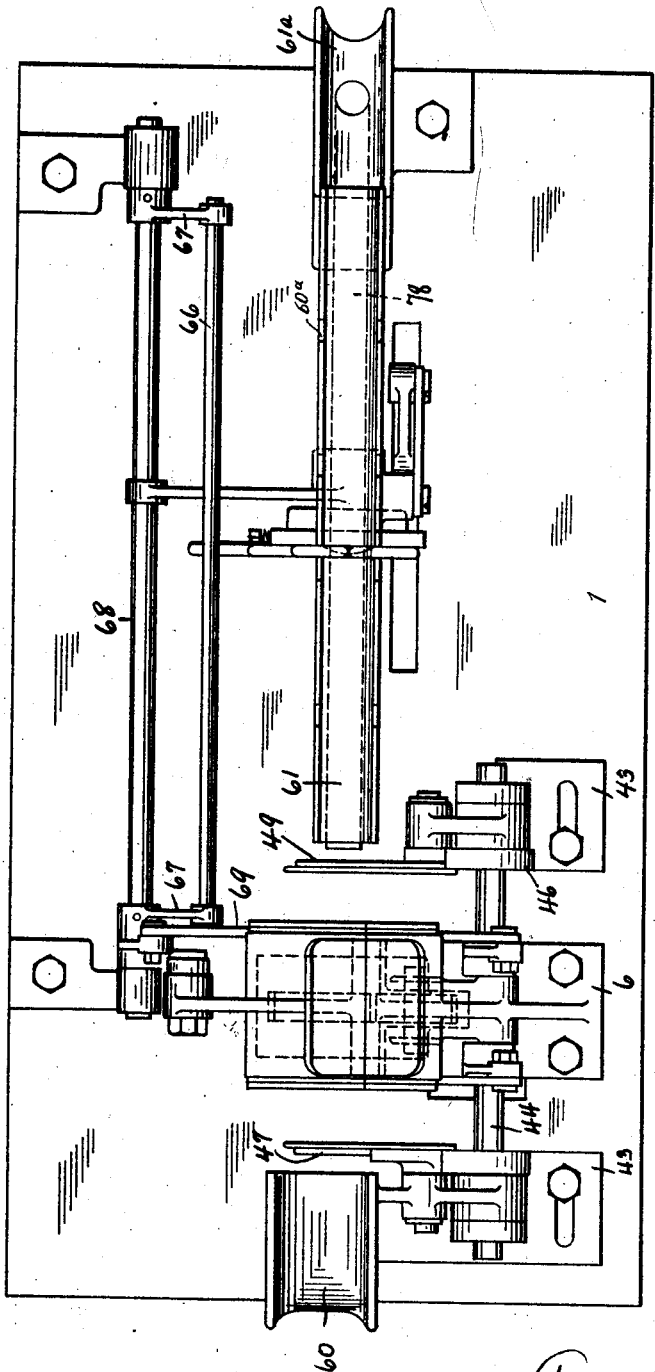

March 12, 1929.    A. L. N. FLEMING    1,705,246
LINKING MACHINE
Filed April 29, 1927    4 Sheets-Sheet 4
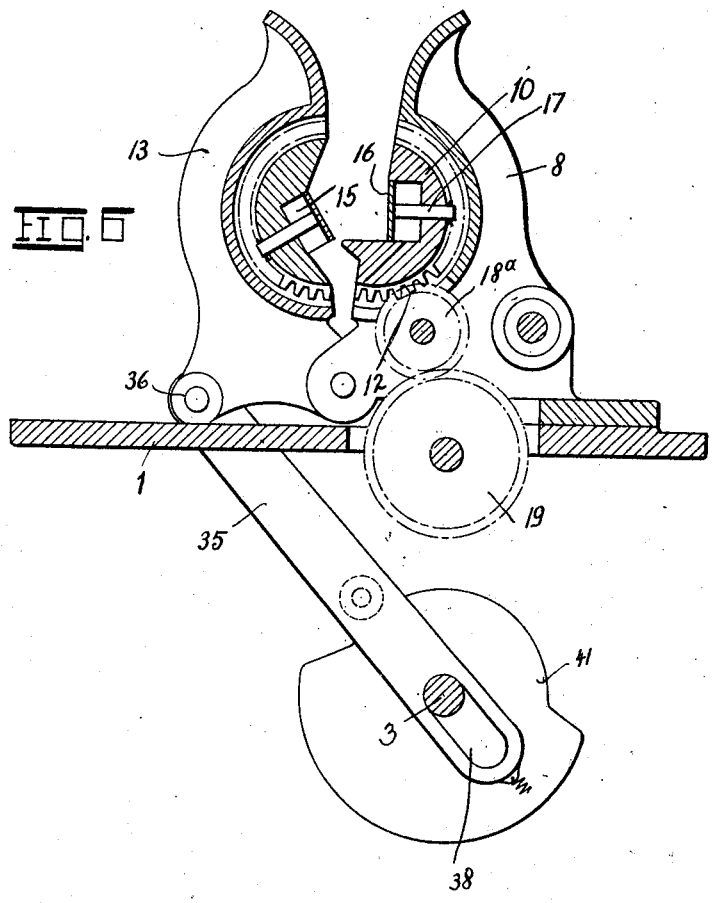
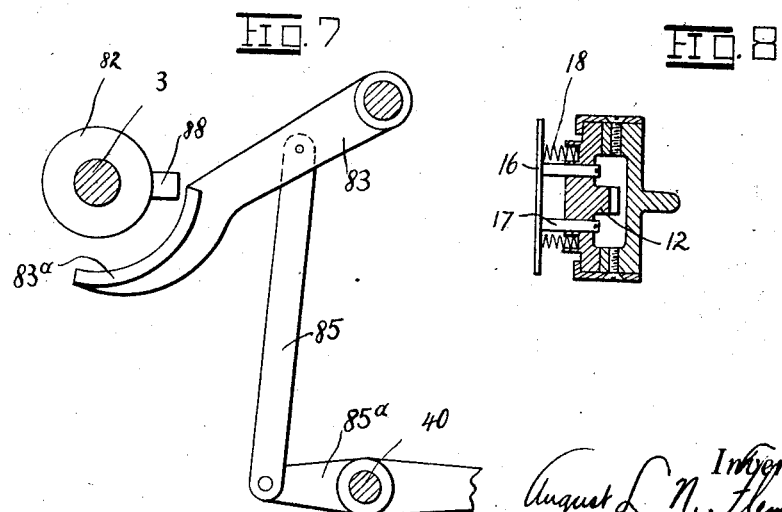

Patented Mar. 12, 1929.

1,705,246

UNITED STATES PATENT OFFICE.

AUGUST L. N. FLEMING, OF LYNDHURST, NEW JERSEY, ASSIGNOR TO SUPERIOR LINKING MACHINE CORPORATION, A CORPORATION OF DELAWARE.

LINKING MACHINE.

Application filed April 29, 1927. Serial No. 187,676.

This invention relates to improvements in machines employed in the manufacture of sausages, frankfurters and the like.

One of the objects of my invention is to construct an automatic machine for dividing, twisting or linking a filled or stuffed casing into definite lengths as required in the manufacture of sausages and frankfurters.

Another object of my invention is to provide a machine in which a filled or stuffed casing is intermittently fed therethrough and divided into uniform, predetermined lengths or sections during a continuous operation, entirely eliminating any manual manipulation of the said casing during its passage.

Another object of my invention is to provide a linking or twisting machine for sausage or frankfurter casings including provision for intermittently clamping and dividing the casing into sections and rotating each second section without fracturing or splitting of the material of the casing.

A continued object of my invention is to provide in a linking or twisting machine for sausage or frankfurter casings, means for intermittently drawing and discharging the twisted or linked sections of the casing in timed relation to the dividing and clamping mechanism whereby each second section of the casing is rotated.

More specifically my invention relates to an automatic, power driven machine, construced and arranged to receive a filled or stuffed casing, clamping the ends of a definite length of the casing, rotating or twisting the clamped portion or section of the casing, releasing the said rotated or twisted section and then advancing the casing a predetermined distance for the next rotating or twisting operation, all in timed relation to produce a continuous process or method in the handling of an article of food.

To enable others skilled in the art to more fully comprehend the underlying features of my invention that the same may be embodied in the practical use and for the purposes intended, reference is had to the accompanying drawing showing a preferred form in which Fig. 1 is a front elevation partly in section.

Fig. 2 is an end view partly in section, and with parts broken away.

Fig. 3 is a view showing the distribution clamp and its relation to the discharge chute.

Fig. 4 is a top plan.

Fig. 5 is a detail showing one of the dividers.

Fig. 6 is a side view partly in section showing the brackets and the operating mechanism therefor.

Fig. 7 is a detail showing the means for interrupting the operation of the cam shaft.

Fig. 8 is a sectional view showing the clamp carried by the bushing of the respective brackets.

Referring now to the drawings wherein like reference characters designate corresponding parts throughout the several views, 1 represents a suitable base or bed or suitable length of a stationary machine frame having the end supports 2 forming a rigid structure on which the operating mechanism above and below the base or bed is mounted. A cam shaft 3 mounted in end bearings 4 may be driven by a pulley 5 from any outside source of power, as from a belt, not shown, or in any other convenient manner depending upon the location of the machine.

Fixed on the base or bed I provide a station bracket 6 rigidly secured by fastening bolts 7, said bracket extending upwardly from the base and having an outwardly curved upper portion 8 as shown by Fig. 2 of the drawings. The inner surface of the bracket portion 8 comprises one-half of a bearing 9 in which a semi-circular bushing 10 is positioned and retained by a recessed end flanged plate 11 fastened by screws $11^a$. The bushing 10 is provided with outer gear teeth 12 whereby the bushing may be rotated in the manner and for the purpose presently to be described. The bracket 6 is equipped with a bearing $13^a$ to which a complementary bracket 13 is hinged at its bottom as at 14 for closing and opening movement relative to the stationary bracket. The inner, upper portion $13^b$ of the hinged bracket 13 is similar in construction to the upper portion of the stationary bracket, being also adapted to receive a semi-circular bushing $10^a$ having outer teeth $12^a$ and retained by a flanged end plate 11. When the hinged bracket is closed, the circular bushing thus formed is concentric with the stationary and hinged brackets and is provided with a continuous gear ring by reason of the outer teeth 12, $12^a$.

On the other hand it will thus be seen that the stationary and hinged brackets when closed constitute a passage or opening through which the filled casing or material may pass or be held temporarily for rotation by the said bushings which together constitute a rotor. Each bushing therefore is provided with a longitudinally extending recess 15 for receiving suitable spring clamps arranged for cooperation with each other to clamp the casing and retain the same while it is being rotated. Specifically, the clamping means for each bushing comprise a flat plate 16 having pins 17 which pass through openings in the bushing and held by end cotter pins. Engaging the plate 16 are springs 18 seated in recesses in the bushing, said springs producing sufficient tension on the plate to clamp or engage and hold the casing while the same is being rotated. The tension however of the springs of the clamps must be such as not to split or break the casing but sufficient to hold or clamp it while the rotary or turning motion is being imparted to the bushings or rotor.

It may be briefly set out at this point that it is desired to first introduce or feed a section of a filled casing between the stationary and hinged brackets when open. A pair of spaced dividers then compress the definite portion of the casing and as the bracket closes the clamping plates engage and hold the portion of the casing between the dividers. A rotary or twisting motion is then imparted to the casing by means of the meshed gears to the concentric bushing, which at this stage is closed, through the outer gear teeth or gear ring. The hinged bracket is then actuated to an open position, the dividers spread or open and the casing is then engaged by a distribution clamp which draws or pulls the casing a definite distance through the discharge channel.

The rotary or twisting motion imparted to the material or casing is produced by means of a gear $18^a$ meshing with the gear ring or teeth of the bushing, said gear $18^a$ meshing with a gear 19 on a shaft 20 mounted in suitable bearings 21 on the base or bed. On the shaft 20 I provide an end gear 22 in meshing relation with a large gear $22^a$ loose on the cam shaft 3. A collar 23 is fixed on the cam shaft to accommodate the end of a sleeve $23^a$ having a key $23^b$ on the inside of the gear $22^a$. The sleeve is provided with a clutch head $24^a$ cooperating with a one tooth clutch 25 and normally held in engagement by the spring 24. The one tooth clutch is also loose on the shaft and is formed with a pinion 26 which is in meshing relation with a segment rack 27 mounted on a short shaft 28. The segment rack 27 is adapted to be rocked back and forth but it will be seen that by reason of the one tooth clutch 25 that rotary movement will be imparted to the gears $22^a$, 21, 19 and $18^a$ in one direction only with the result that the bushing which at this period is closed imparts the desired rotary operation or twisting of the casing. On the other hand, the operation of the segment rack 27 in the opposite direction will not effect or produce the rotary motion to the casing at a time or period when the bracket is opened and the casing is being drawn through the discharge channel by means of the distribution clamps further to be described.

Oscillating or rocking motion to the segment rack 27 is imparted by an eccentric 29 having a collar 30 keyed on the cam shaft, said eccentric having a rearwardly extending eccentric lever 31 pivotally connected at 32 to an extension arm 33 mounted on a shaft 34.

The means for opening and closing the bracket 13 is accomplished by a yoke 35 pivotally connected at 36 to the rearward extension 37 of the bracket, the lower end of said yoke being slotted as at 38 and held under tension by a spring 39 attached to a rock shaft 40 between the supports of the frame. Keyed on the cam shaft 3 in proximity to the yoke 35 is an eccentric 41 having a collar $41^a$, said eccentric cooperating with a friction roller 42 on the yoke whereby a reciprocatory motion or intermittent opening and closing movement is imparted to the bracket in timed relation with a pair of dividers and distribution clamps now to be described.

At opposite sides of the brackets I provide adjustable bearing supports 43, 43 having vertical bearings $43^a$ and a shaft 44. Keyed to the shaft by a sliding key 45 are the collars 46 of divider plates 47. Each divider plate is provided with a V-shaped notch 48 which cooperates with a bent arm 49 bridging the notch so as to clamp at two points a section of the casing or material being fed through the bushing of the brackets above referred to. The bent arm 49 is equipped with a one tooth bearing 50 which engages a notch 51 adjacent the collar 46 so that when the shaft on which the collar is mounted is oscillated, the plate and bent arm of the dividers will simultaneously spread to an open position permitting the casing or material to be drawn through the discharge channel by the distribution clamps further to be described. It will of course be understood that the dividers, are located on opposite sides of and in spaced relation to the brackets and are adjustable relative thereto for the desired length of the casing to be twisted or linked. The operation, however, is such that the pair of dividers open and close simultaneously and in advance of the closing of the bracket. This operation is accomplished by means of an arm 52 connected to the shaft on which the collars are mounted, the opposite end of the arm 52 being pivoted as at 53 to the upper end of a yoke 54. The lower end of the yoke is slotted as at 55 and has attached thereto a spring 56, said spring being connected to a rod $55^a$ between the supports. On the yoke 54 is a roller $54^a$ cooperating with a cam 57, said cam being provided with a collar 58 keyed to the cam shaft. This construction permits of the operation of the dividers to hold a convenient length or section of the casing preliminary to the closing of the bracket and the clamping of a definite portion of the body of said casing whereby the casing may be rotated when the dividers are in the closed position.

The material which is in the form of a filled, elongated circular casing is fed through the entrance channel or feed chute 60 which is open at each end and directly in alignment with the bushing of the brackets.

A guide channel 61 which is substantially U-shaped in cross-section is positioned at the opposite side of the brackets and also in direct longitudinal alignment with the bushing thereof and the entrance feed chute 60 so that when the dividers spread and the bracket opens, the casing or material may be intermittently drawn through the guide channel to the outlet or discharge end 61ᵃ.

Referring particularly to Fig. 1 it will be noted that the guide channel is equipped with a plurality of slots 60ᵃ located for the passage of cooperating complementary distribution clamps 62, 63.

The distribution clamp 62 comprises a substantial bell crank lever having an inverted U-shaped upward extremity 64 extending above and adapted to pass through a slot 60ᵃ in the guide channel. The said clamp 62 is provided with a rearward extension arm 65 which is adapted to be actuated by a rod 66, the ends of said rod being mounted on the crank arms 67 of a rock shaft 68. The rock shaft 68 is in turn connected to the shaft on which the divider plate is mounted by means of the curved lever 69. The complementary clamp 63 is also provided with an inverted upper extremity 64ᵃ extending above and adapted to pass through a slot in the opposite side of the guide channel. The clamps are mounted in suitable bearings and provided with meshed segment gears 70. A spring 71 connecting the upper portions of the clamps permits said clamps to close at the moment that they are brought into registration with the openings in the channel, the meshed gears 70 also opening or spreading the clamps to clear the channel from the full line to the dotted line positions, as shown by Fig. 3, when the arm of one of the clamps is engaged by the rod.

Referring to Fig. 1, the means for intermittently sliding or drawing the casing or material through the discharge channel is accomplished by a lever 72 pivotally connected at its lower end to a bearing 73 and pivotally connected as at 74 to a link 75, said link being in turn attached at 76 to a block 77 slidable on a guide shaft 78. The block is of course connected to the distribution clamps so as to actuate the same to slide or draw the casing through the discharge channel or to the right of Fig. 1. On the lever 72 I provide a roller 72ᵃ cooperating with a cam 80 said cam having a collar 80ᵃ keyed on the cam shaft 3. A spring 81 connects the lever to an end support and normally tends to draw the lever 72 to the right, the movement in the opposite direction being effected by the cam 80.

On the cam shaft 3, I also provide a one tooth clutch 82, similar to the clutch 25. A pivoted lever 83 held under tension by a spring 84 is connected by a link 85 to a lever 85ᵃ on the rock shaft 40. The lever 83 is provided with a wedge shaped projection 83ᵃ which is adapted to cooperate with a friction roller 88 on the clutch 82 to disengage the same, which operation is effected by means of the foot lever 87 on the said rock shaft. A spring 89 tends to normally maintain the clutch 82 in its engaged or operative position but when it is desired to interrupt the operation of the shaft 3 and the mechanism controlling the hinged bracket, dividers and distribution clamp, as when the end of the filled casing is first being fed, the foot lever may be depressed to perform this function.

From the above description the operation of the machine may be easily followed in the sequence of the cooperating mechanism as the filled casing is drawn through the entrance channel. In order to link frankfurters, the foot lever is depressed with the result that the one tooth clutch, to the left see Fig. 1 renders the cam shaft inoperative and stops the machine in which instance the brackets are spaced apart or opened wide forming a passage through which a section of the filled casing may be inserted. As the foot lever is released and the cam shaft set in operation the dividers close thus clamping a definite section of the casing to be rotated. As soon as the brackets close the gear ring on the concentric bushing is actuated by means of the meshed gearing and since the section of the casing is held in clamping relation by the spring controlled clamps, carried by the bushing, a swift rotary motion is imparted to the casing held between the dividers. As the large segment rack then oscillates backwardly, the distribution clamps are brought into play so as to engage the casing at a point held by one of the dividers which at this moment are opened, permitting the said casing to be drawn through the channel, a predetermined distance or twice the length of a section of the casing, and at which time the distribution clamps are also opened. The next section of the casing is ready to be engaged by the dividers and clamps of the bushing for the subsequent rotation thereof. By referring to Fig. 6, it will be noted that the bushing 10 intermittently rotatable within the movable brackets is constructed and arranged so that said sections of the bushing are caused to stop with the division between them, substantially coincident with the line of divisions between brackets 8, 13. The dividers, the stationary and hinged brackets and the distribution clamps all function and operate in timed relation with each other in their opening and closing movement to render the machine automatic so that when one end of the filled casing is once positioned linking or twisting of the sections takes place continuously to produce the uniform lengths of the material being handled.

While I have shown and described my invention with some degree of particularity, I realize that various changes and alterations in the details of the description may be resorted to. I therefore reserve the right to make such changes, modifications, and alterations in the details as may fairly fall within the scope of the subject matter now being claimed.

Having shown and described my invention what I claim as new and desire to secure by Letters Patent is:—

1. A linking machine of the class described comprising a stationary and a hinged bracket, means for opening and closing the hinged bracket, a sectional, rotatable element supported by said brackets for clamping a section of a filled casing fed therebetween, dividers for clamping the ends of said section, means for intermittently rotating said element when the hinged bracket is closed and means for intermittently advancing the filled casing when the said hinged bracket is opened.

2. A linking machine of the class described comprising a stationary and a hinged bracket, means for intermittently opening and closing the hinged bracket, a sectional, rotatable element within the brackets for clamping a section of a filled casing fed between the sections of the said elements, dividers for clamping the ends of said section of the casing in advance of the closing of the hinged bracket, means for intermittently rotating the rotatable element and the section of the casing held thereby and means for intermittently advancing the divided casing a definite distance when the hinged bracket is opened.

3. A linking machine of the class described comprising a stationary and a hinged bracket, a sectional bushing having gear teeth supported by said brackets, means for intermittently opening and closing the brackets, gearing for rotating the bushing when the said hinged bracket is closed, dividers on each side of the brackets for clamping the ends of a section of a filled casing fed between the sectional bushing and means for intermittently advancing the divided casing a definite distance when the hinged bracket is opened.

4. A linking machine of the class described comprising a stationary and a hinged bracket, a sectional bushing having gear teeth supported for free rotation within the brackets, means for intermittently opening and closing the said bracket, a pair of dividers on each side of the brackets adapted to be opened and closed in timed relation with the hinged bracket for clamping the ends of a section of a filled casing, a delivery and discharge chute in longitudinal alignment with the passage between the said brackets and means for intermittently advancing the divided casing a definite distance in said chute when the hinged bracket is open.

5. A linking machine of the class described comprising two coacting members, a sectional bushing between said members arranged to receive a section of a filled casing therebetween, dividers for clamping the ends of said section, a delivery and discharge chute in alignment with the passage between the coacting members and said clamping means and a distribution clamp cooperating with the discharge chute for advancing the divided casing a definite distance.

6. A linking machine of the class described comprising two coacting members arranged for movement relative to each other to receive a section of a filled casing therebetween, dividers for clamping the ends of said section, means for intermittently rotating the portion of the casing held by the coacting members, a distribution clamp for intermittently advancing the casing twice the length of the section held by said coacting members and a shaft having independent means for each of the coacting members, dividers and distribution clamp for operating the same in timed relation to each other.

7. A linking machine of the class described comprising two coacting members arranged to receive a section of a filled casing therebetween, dividers for clamping the ends of said section, means for rotating the portion of the casing held by said coacting members, a distribution clamp, an operating shaft, independent means on said shaft for intermittently actuating the coacting members, dividers and clamp in timed relation to each other and means for interrupting the operation of the said shaft.

8. A linking machine of the class described comprising two coacting members arranged to receive a section of a filled casing therebetween, dividers for clamping the ends of said section, means for rotating the portion of the casing held by said coacting members, a reciprocating distribution clamp, an operating shaft, independent means on the shaft for actuating the coacting members, dividers and distribution clamp to their opened and closed position in timed relation to each other, said members and dividers being open when the distribution clamp is closed whereby the casing may be advanced and means for interrupting the operation of the said shaft.

9. A linking machine of the class described comprising two coacting brackets arranged to receive a section of a filled casing therebetween, means for clamping the ends of said section, and means within said coacting brackets for clamping and rotating said section.

10. A linking machine of the class described comprising two coacting brackets arranged to receive a section of a filled casing therebetween, means for clamping the ends of said section and a rotor within said coacting brackets for clamping and rotating said section relative to said brackets.

11. A linking machine of the class described comprising two coacting brackets arranged to open and close to receive a section of a filled casing therebetween, means for clamping the ends of said section, and a sectional rotor having resilient clamping means within said coacting brackets for rotating said casing relative to said brackets.

12. A linking machine of the class described comprising two coacting brackets arranged to open and close to receive a section of a filled casing therebetween, means for clamping the ends of said section, a sectional rotor within the coacting brackets for clamping and rotating said section, and means for rotating said rotor when said coacting brackets are closed.

13. A linking machine of the class described comprising two relatively movable brackets arranged to open and close to receive a section of a filled casing therebetween, means for clamping the ends of said section, a sectional rotor within said brackets, opposed clamping means carried by said rotor, means for rotating said rotor when said brackets are in closed positions and means for advancing said section of the casing when said brackets are in open position.

14. A linking machine of the class described comprising a pair of hinged brackets adapted to open and close to receive a section of a filled casing therebetween, means for clamping the ends of said section, a sectional rotor within said brackets and resilient clamping means carried by each section of said rotor, and means for separating said sections of the rotor in timed relation with the opening of the hinged brackets whereby the section of the casing may be advanced through the machine.

15. A structure as specified in the preceding claim, in which the resilient clamping means carried by each section comprises a substantially flat plate movable relative to such member and a spring interposed between such plate and such member.

16. In a linking machine, a pair of relatively movable brackets, a pair of rotor members adapted to rotate in said brackets, resilient jaws carried by the rotatable members, means for rotating said members and the jaws when said brackets are brought together and said jaws are closed, and means for intermittently moving said brackets and said rotatable members apart to form an open channel through which a filled casing may move and for again bringing said brackets and rotatable members together whereby said jaws may engage such casing.

17. In a linking machine, a pair of relatively movable rotor members, resilient jaws carried by said members, means for intermittently rotating said members when they are together and said jaws are closed, and means for intermittently moving said members apart to open said jaws and thereafter bringing them together to close the jaws.

18. In a linking machine, a pair of members adapted yieldingly to engage a filled casing, means for intermittently rotating said members, and means for automatically moving said members apart to form an unobstructed channel between said members in which a filled casing may be laid.

19. A linking machine of the class described comprising two coacting rotor members, resilient clamping means carried by said members arranged to receive a section of a filled casing therebetween, means for clamping the ends of said section and means for intermittently rotating said rotor members.

20. In a machine of the type described, a pair of relatively movable brackets which when together form a circular seat, a bushing adapted to rotate in such seat and divided longitudinally into two parts, means for intermittently rotating such bushing and causing the same to stop with the division between the two parts thereof approximately coincident with the line of division between the brackets, and means for separating the brackets and simultaneously separating the two parts of the bushing.

In testimony whereof I affix my signature.

AUGUST L. N. FLEMING.